US005649997A

United States Patent [19]

Cavallero et al.

[11] Patent Number: 5,649,997

[45] Date of Patent: Jul. 22, 1997

[54] AIR VACUUM APPARATUS

[76] Inventors: Thomas Cavallero, 5714 Maywood Dr., Foresthill, Calif. 95621; Nickolas C. Gibson, P.O. Box 773, Carson City, Nev. 89702; Richard Bilyak, P.O. Box PTG Box 1445, Rancho Cucamonga, Calif. 91729-1445

[21] Appl. No.: 444,847

[22] Filed: May 19, 1995

[51] Int. Cl.$^6$ .......... B01D 53/00

[52] U.S. Cl. .......... 95/284; 55/385.1; 55/385.8; 55/DIG. 29; 131/238; 131/331; 273/274; 273/309; 454/49; 454/230; 454/306; 454/338

[58] Field of Search .......... 55/385.1, 385.8, 55/DIG. 18, DIG. 29; 454/230, 49, 306, 338; 95/273, 284; 273/309, 274; 108/50, 161; 131/238, 340, 331

[56] References Cited

U.S. PATENT DOCUMENTS

| | | | |
|---|---|---|---|
| 2,347,334 | 4/1944 | Schmeig | 55/DIG. 18 |
| 2,572,120 | 10/1951 | Dixon | 454/230 |
| 3,880,061 | 4/1975 | Hensiek et al. | 55/DIG. 29 |
| 4,248,162 | 2/1981 | Skeist | 454/230 |
| 4,623,367 | 11/1986 | Paulson | 454/230 |
| 4,898,089 | 2/1990 | Roos | 55/DIG. 18 |
| 5,085,134 | 2/1992 | Hofstra et al. | 55/385.8 |
| 5,244,433 | 9/1993 | Utterback | 454/49 |
| 5,306,207 | 4/1994 | Courts | 454/49 |
| 5,417,433 | 5/1995 | Phillips | 55/385.1 |
| 5,441,279 | 8/1995 | Messina | 55/385.1 |
| 5,562,286 | 10/1996 | Brinket | 55/385.1 |

FOREIGN PATENT DOCUMENTS

| | | | |
|---|---|---|---|
| 6-154415 | 6/1994 | Japan | 55/385.8 |

*Primary Examiner*—Jay H. Woo
*Assistant Examiner*—Duane S. Smith
*Attorney, Agent, or Firm*—Michael A. Glenn; Laurie J. Mintz

[57] ABSTRACT

Apparatus for use with a gaming table or other surfaces for removing and filtering indoor airborne fumes and particles at their point of origin. A laminar exhaust air flow is created across the table surface. The laminar exhaust is drawn by vacuum through air intakes positioned at the table surface and ported through exhaust ducts for filtering and discharge.

17 Claims, 2 Drawing Sheets

AIR VACUUM APPARATUS

BACKGROUND OF THE INVENTION

1. Technical Field

The invention relates to exhaust and ventilation systems. More particularly, the invention relates to an apparatus and method for removing and filtering airborne fumes and particles at their point of origin.

2. Description of the Prior Art

The serious health consequences from inhalation of second-hand cigarette smoke are well documented. In response to this significant public health problem, health regulations have been enacted at local, state, and federal levels to reduce the public exposure to the harmful fumes.

The impact of second-hand smoke is clearly felt by restaurants, bingo parlors, public meeting places, casinos, and gaming establishments. In a casino, smokers and non-smokers sit side by side for extended periods in close proximity to casino workers. Under these conditions, compliance with city, county, state, and Federal public health regulations and Federal OSHA standards is costly. While banning smoking outright is a possible solution, a casino faces the potential loss of significant income from smokers who need frequent breaks from gambling to smoke, or who choose to patronize establishments that permit smoking. On the other hand, the failure to eliminate smoke fumes subjects the casinos to employee lawsuits, as well as the loss of business from non-smokers. Similar problems arise in chemical and biological laboratories, as well as in manufacturing processing or assembly facilities that use toxic materials.

Contemporary technology for the elimination of airborne irritants address the problem with ceiling fans, ventilators, exhaust blowers, and air conditioning systems. While these systems do remove the irritants from indoor areas, they are unable to remove the undesirable fumes and particles at their source, prior to their diffusion through and contamination of the atmosphere.

It would be a significant advance in the art to provide an apparatus that removes and filters airborne particles, particularly smoke particles, and noxious fumes at their origin, and thus permits non-smokers to remain in close proximity to smokers while minimizing the deleterious effects of second-hand smoke.

SUMMARY OF THE INVENTION

The invention provides an air vacuum apparatus for removing and filtering indoor airborne fumes and particles at their point of origin. In the preferred embodiment of the invention, the apparatus is adapted for use with a gaming table. A vacuum flow is created in air intake ducts positioned about the table's surface. This vacuum is preferably created by a variable-speed, rectangular inline centrifugal fan. In alternate embodiments of the invention, the vacuum is produced by a central system, where individual table units exhaust to a common collection point.

A laminar exhaust air flow including smoke and fumes is created across the table surface in response to the vacuum. The laminar intake exhaust air flow is ported through the air intake exhaust ducts to a high efficiency filter, included in the system, and fitting underneath the table, and the smoke and fumes are thence captured, such that clean air is discharged. In alternate embodiments of the invention, the exhaust is ported to a central exhaust system.

DETAILED DESCRIPTION OF THE INVENTION

Figure 1:
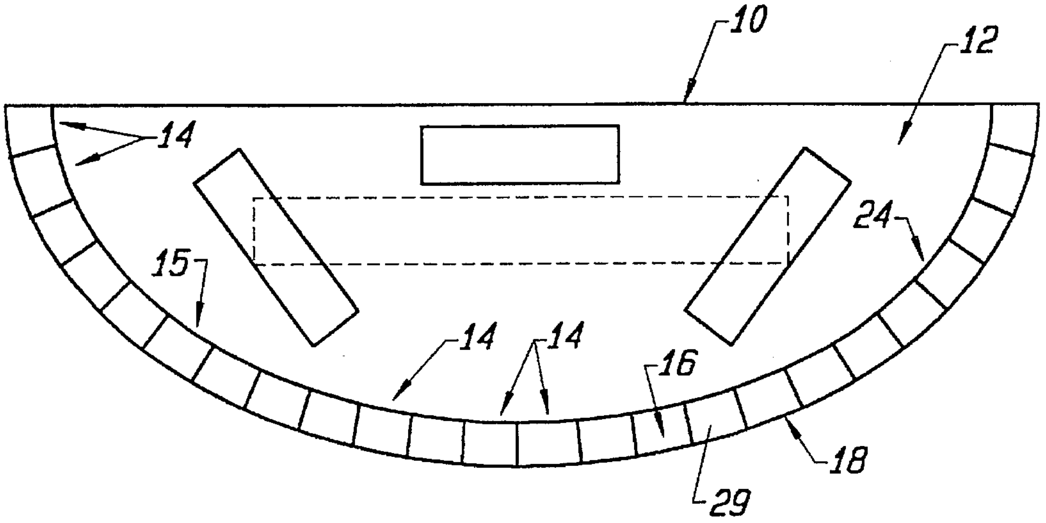
FIG. 1 is a top view of the air vacuum apparatus of the preferred embodiment of the invention.

The invention provides an air vacuum apparatus for removing and filtering indoor airborne fumes and particles at their origin. FIG. 1 shows a top view of the preferred embodiment of the invention,i.e. an air vacuum apparatus adapted for use in casino gaming tables. By application of the apparatus and method of the invention, non-smokers are able to sit next to smokers with minimal inconvenience from second-hand smoke.

The surface 12 of the gaming table 10 has slots 24 around its edge 18. The number and location of slots varies in alternate embodiments of the invention. For example, a craps table may include additional slots under the chip holders, a bingo table may include slots in a raised platform above the center of the table, while a slot machine may include slots along its front side, located under decorative bezels.

Vacuum intake exhaust ducts 16 are fitted into these slots and connected with a rectangular inline centrifugal duct fan 20 (see FIG. 2) to create a vacuum in the ducts. While it is readily appreciated that alternate embodiments may use one or many ducts, the preferred embodiment of the invention has strategically placed ducts. In this embodiment, the table's arm rest 29 is raised, preferably 1½ to 2 inches, to accommodate the intake plenum created by the raised arm rest, which extends inside the table. Alternately, the arm rest may be raised to a different level, or the ducts run along the outside of the table surface. A variation of this design places the intake ducts 24 on the table surface in front of the arm rest, eliminating the plenum and drawing air directly into the intake ducts.

Figure 2:
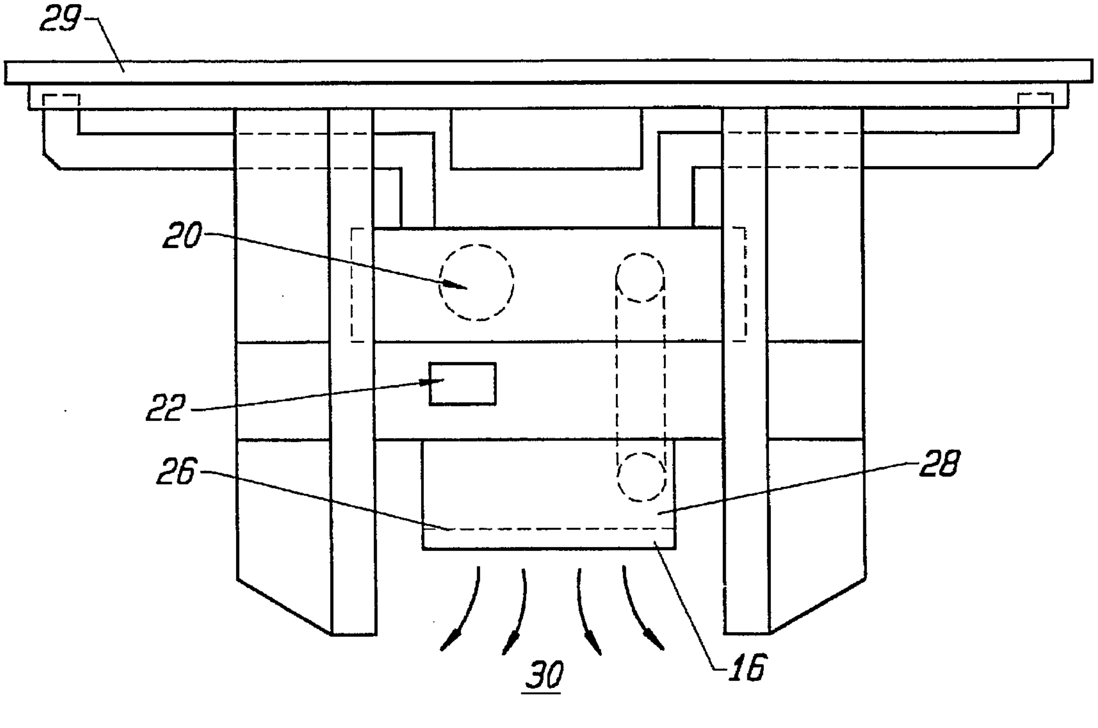
FIG. 2 is a front sectional view of the air vacuum apparatus of the preferred embodiment of the invention.

FIG. 2 is a front sectional view of the invention. The table may include one or more rectangular inline centrifugal fans 20. One fan is preferably used for each system; some table may require two or more systems. The fan may have a fixed speed, or may be operated by variable speed control as desired. In the preferred embodiment of the invention, an external control 22 sets the speed of the fan to vary the amount of vacuum and permit customization of tables. Such control may be effected by a solid state controller or by a variable transformer.

The fan is preferably located underneath the table, and, in other embodiments, is located inside the table housing, in the table base, or at a location remote from the table. In yet another embodiment of the invention, the ducts are connected to a central vacuum-producing unit, rather than to fans located within individual tables. The ducts may be left uncovered, or may be covered, for example, with a mesh screen or an ornamental strip that permit air flow but that prevent objects from being drawn into the exhaust by the vacuum. If desired, a blower may be used to provide a positive supply of clean air across the table surface, where the pressure of the positive supply is less than that of the exhaust vacuum, such that the laminar air flow across the table surface is reinforced.

The vacuum-producing devices are optionally controlled manually or in response to external conditions, for example, the presence of a specific concentration of smoke. The system may be actuated automatically, for example by such devices as proximity detectors, photo sensors, bimetal resistors, infrared detectors, and laser detectors.

In response to the vacuum, a laminar exhaust air flow 14 is created across the table surface. A vacuum draws this laminar exhaust through air intakes 16 positioned at the table surface. The laminar air flow is ported through intake ducts 16 to a high efficiency filter 26. The filter is preferably formed of a charged, split fiber material that is capable of capturing particles down to 0.3 microns in size. In the preferred embodiment of the invention, the filter is located in a filter box 28 that fits above the fan assembly. The filter box allows the system to draw air across the filter and not blow through the filter. A secondary filter can be placed at the exhaust end of the system for additional particle capture. The filter box dimensions are chosen as appropriate, depending upon the table space. The filter may alternately be located at a remote location.

In alternate embodiments of the invention, the exhaust is ported to a central exhaust system. Several, or all of the tables in a casino may be connected to a common filter exhaust. The air may be filtered and returned to the room 30, or filtered and ejected from the room or building.

Figure 3:
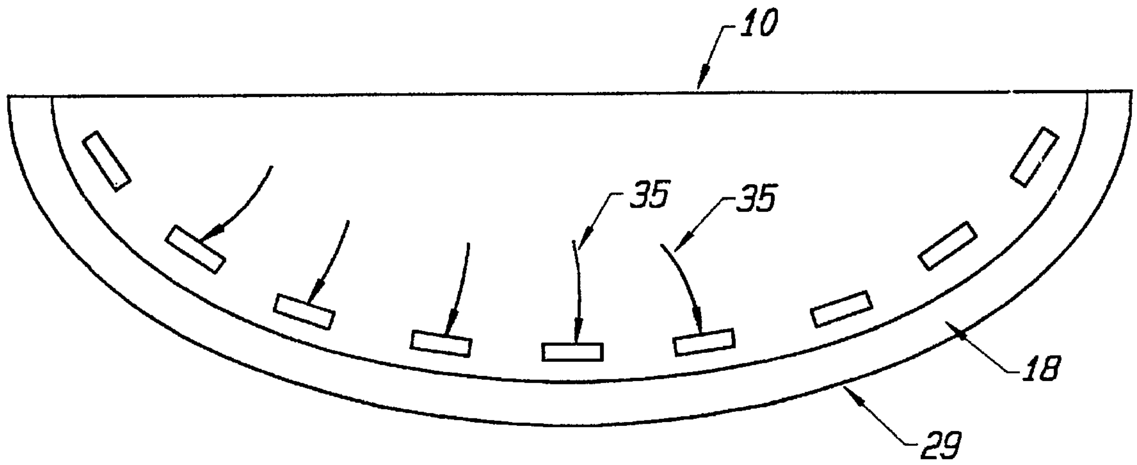
FIG. 3 is a top view of the air vacuum apparatus of an alternative, equally preferred embodiment of the invention.

FIG. 3 is a top view of the air vacuum apparatus of an alternative, equally preferred embodiment of the invention. In the figure, the air intake 35 is located in the surface of the table itself. Such embodiment is useful, for example where arm rests are not provided. e.g. an operating table or an assembly table.

Although the invention is described herein with reference to the preferred embodiment, one skilled in the art will readily appreciate that other applications may be substituted for those set forth herein without departing from the spirit and scope of the invention. For example, the vacuum apparatus may be provided as a kit to retrofit current gaming tables, or may be included as an integral component of a manufactured table. The invention may also be applied in conjunction with other exhaust systems, such as that described in Airborne Particle Exhaust System, U.S. Pat. No. 5,067,394, (26 Nov. 1991). Accordingly, the invention should only be limited by the claims included below.

We claim:

1. An air vacuum apparatus, comprising:

vacuum means for imparting a pressure gradient across a surface of a table to generate a laminar exhaust air flow over said surface;

at least one duct, positioned at said surface for porting said laminar air flow from said surface in response to said vacuum means; and means coupled to said at least one duct for discharging said laminar exhaust air flow at a remote location from said surface;

wherein said vacuum means comprises at least one fan; and wherein said at least one fan is at least one rectangular inline centrifugal duct fan.

2. The air vacuum apparatus of claim 1, further comprising a control for setting said fan to permit variable fan speed and vacuum strength.

3. The air vacuum apparatus of claim 1, further comprising:

at least one filter, coupled to said discharging means, for removing said fumes and smoke.

4. The air vacuum apparatus of claim 1, wherein said apparatus is adapted for attachment to a table.

5. The air vacuum apparatus of claim 3, wherein said at least one filter is adapted to fit underneath said table.

6. The air vacuum apparatus of claim 1, further comprising at least one central exhaust system for discharging said laminar exhaust.

7. The air vacuum apparatus of claim 1, further comprising at least one filter for discharging said laminar exhaust.

8. The air vacuum apparatus of claim 1, further comprising manual control means to operate said vacuum means.

9. The air vacuum apparatus of claim 1, further comprising automatic detector means selected from the group consisting of smoke detectors, photo sensors, bimetal resistors, and laser detectors to operate said vacuum means.

10. The air vacuum apparatus of claim 9, wherein said automatic detector means is any of a proximity detector, bimetal resistive detector, infrared detector, laser detector, and a photosensitive smoke detector.

11. The air vacuum apparatus of claim 1 wherein said table is any of a gaming table, a manufacturing table, a pathology table, a restaurant table, a bar table, a meeting table, a dissecting table, a surgery table, and an assembly table.

12. An air vacuum apparatus, comprising;

vacuum means, comprising at least one rectangular inline centrifugal duct fan adapted for supplying a vacuum to create a laminar exhaust air flow across a surface;

at least one duct, positioned at said surface for porting said laminar exhaust flow from said surface in response to said vacuum means; and means coupled to said porting means for discharging said laminar flow at a remote location from said surface wherein said apparatus is adapted for insertion within a gaming device.

13. The air vacuum apparatus of claim 12, further comprising;

a control for setting said fan to permit variable fan speed and vacuum strength.

14. The air vacuum apparatus of claim 12, further comprising manual control means for activating said fan.

15. The air vacuum apparatus of claim 12, further comprising automatic detector means for activating said fan.

16. The air vacuum apparatus of claim 12, wherein said gaming device is any of a slot machine and a video gaming machine.

17. A method for removing and filtering airborne fumes and particles at their point of origin, comprising the steps of:

generating a vacuum over a surface of a table;

creating a laminar exhaust air flow across the surface in response to the generation of said vacuum; the vacuum and laminar exhaust air flow generated and created by at least one rectangular inline centrifugal duct fan;

porting said laminar exhaust air flow from said surface through at least one duct in response to the generation of said vacuum; and discharging said laminar exhaust air flow at a remote location from said surface.

* * * * *